T. O. ORGAN.
LUBRICATOR.
APPLICATION FILED OCT. 28, 1911.

1,092,164.

Patented Apr. 7, 1914.

WITNESSES:
René Bruine
Fred White

INVENTOR:
Thomas O. Organ,
By Attorneys,
Fraser, Turk & Myers

UNITED STATES PATENT OFFICE.

THOMAS O. ORGAN, OF GERMANTOWN, PENNSYLVANIA, ASSIGNOR TO AUGUSTUS CRANE BUZBY, OF PHILADELPHIA, PENNSYLVANIA.

LUBRICATOR.

1,092,164.   Specification of Letters Patent.   Patented Apr. 7, 1914.

Application filed October 28, 1911. Serial No. 657,232.

*To all whom it may concern:*

Be it known that I, THOMAS O. ORGAN, a citizen of the United States, residing in Germantown, in the county of Philadelphia and State of Pennsylvania, have invented certain new and useful Improvements in Lubricators, of which the following is a specification.

My invention relates to lubricators of the drip feed variety, and is especially designed to produce a lubricator which may be used with liquid grease. In lubricators intended for such use, owing to the extreme viscosity of the lubricant, great difficulty is experienced with the closing up of the lubricator outlet ports.

An object of my invention therefore is to provide a construction wherein the said outlet ports will not become closed up.

Further, and an important object of my invention, is to provide means whereby the air feed may be accurately adjusted so as to feed the lubricant in the desired quantities and at desired intervals.

An object of my invention is also to provide means whereby back flow of air to the lubricating cup shall be prevented, and also to provide an improved dropping device.

These and other objects will appear as the specification proceeds, together with the manner in which I have accomplished such objects.

A desirable form in which my invention may be embodied is illustrated in the accompanying drawings, wherein—

Figure 1:
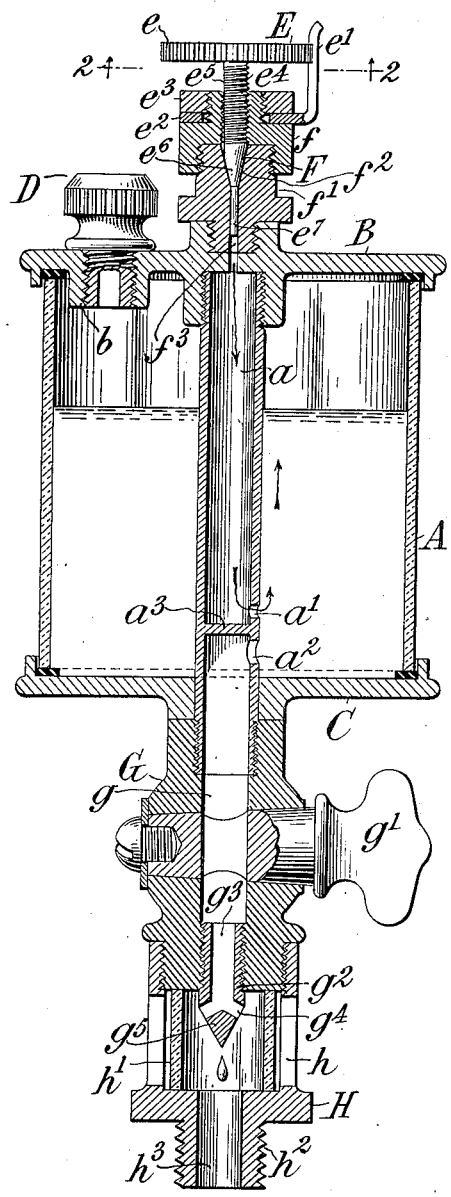
Figure 2:
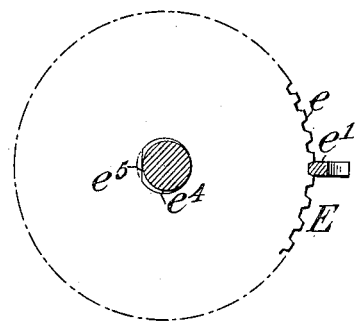
Figure 3:
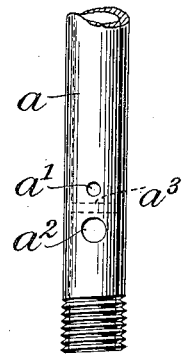
Figure 4:
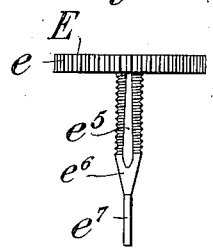

Figure 1 represents a vertical section of a lubricator; Fig. 2 illustrates a section on the line 2—2 of Fig. 1; Fig. 3 is a detail view in elevation of a portion of a tube; and Fig. 4 is a detail of the inlet valve.

Owing to the friction exerted upon passing air by the walls of the passage, the inlet of air is better controlled where such walls are close together than where they are separated. Accordingly an air inlet of the same area in cross-section will better control the air feed where it is of extended slit-like form, than where it is of increased width but of decreased length. I have therefore provided my lubricator with an air feed having a channel which is variable in size according to the adjustment of the valve, and which leads to narrow slit-like channels one of which is of constant width in all adjustments of the valve, and thereby I have attained an accurate control of the air feed. The air from the air feed is conducted through a tube to the lower part of the reservoir where the air port is located, which is of small size, and the air bubble passing through this port serves not only to keep the port clean and prevent its being closed up by the grease, but likewise further restricts the feeding of grease from the cup by the passage of the bubble through the said port and up through the body of grease. An outlet port of larger size is further provided, which leads to a channel terminating in a plurality of ports which are individually of less size than the channel, and collectively of about the same cross-sectional area, and by means of the said discharge ports a back-flow of air is prevented.

In the particular form in which my invention is illustrated in the accompanying drawings, the lubricating cup A, made as usual of glass, is provided with a cover B and with a floor C. Upon the cover B is the feed stopper D, which is threaded in an opening $b$ in the said cover. An air valve E is threaded in an inlet of the passage F in the said cover. This passage is formed in several members for convenience of construction, embodying a socket $f$ which is threaded upon a block $f^1$ which in turn is threaded into the cover B. The valve E is preferably provided with a milled handle $e$, and is held in adjusted position by a spring $e^1$ which is contained upon a washer $e^2$ held in place upon the socket $f$ by a threaded washer $e^3$. The stem $e^4$ of the valve E is threaded to enter a correspondingly threaded bore in the air inlet F, and this bore as illustrated is located within the socket $f$. An adjustable air inlet is provided upon the said stem, and a convenient method of providing this is by making a channel of variable width $e^5$ upon the said stem. As illustrated, this channel is formed by cutting away the threads in a wedge shape, so that as the valve is withdrawn the size of the air inlet opening is increased. Upon the part of said stem adjacent the said threaded part, is situated a tapered body $e^6$ which when the valve is closed is seated against a correspondingly shaped tapered seat $f^2$ in the air inlet. As illustrated, this tapered seat is formed in the plug $f^1$. This tapered valve body and seat close the valve and effectually shut off the inflow of air when the said valve is closed. When the valve is open it provides a narrow slit-like inlet the width of which is increased as the valve is opened further. An extension $e^7$ in the form, as illustrated, of a straight annular projection from the stem, is seated within a straight reduced bore $f^3$ of the air inlet, and this reduced portion of the bore as illustrated is formed partly in the plug $f^1$ and partly in the cover B. Such extension $e^7$ of the valve stem has a loose fit with the reduced bore $f^3$, sufficient to admit air slowly therethrough. By means of the said air passage formed in a narrow slit-like form between the extension $e^7$ and tse small bore $f^3$, I am enabled to effectually throttle the air supply and feed the same in desired quantities to the lubricating cup. This is due to the fact that the air is retarded by the friction of the adjacent walls and the passage is therefore made narrow so that the passage of the air shall be retarded as much as possible. It follows that as the air flows faster through the center of a pipe than at the sides, that air will flow more freely through an opening of a given area if such opening is relatively wide than if such opening were extended in a narrow slit-like form. The air supply passing the said parts will be increased as the air pressure is increased, owing to the increase in size of the air inlet $e^5$ and the increased width of inlet between the tapered valve body and its seat.

A tube $a$ is mounted preferably substantially centrally within the cup A, and is secured to the cover as by being threaded therein as illustrated. Said tube communicates with the air inlet F, and has at its lower part which is near the bottom of the cup A, an air port $a^1$. Immediately below this is the lubricator port $a^2$, and the said ports are separated by a partition $a^3$ located horizontally in the said tube. The air inlet port $a^1$ is of small size as shown, whereas the lubricant port $a^2$ is of larger size. The tube is preferably threaded in a valve plug G which is provided with a bore $g$ communicating with the tube $a$ and with a valve $g^1$ adapted to close the bore $g$. In the lower end of this valve body G is threaded a plug $g^2$ which has a bore $g^3$ communicating with the bore $g$ and terminating at the bottom in a plurality of discharge ports $g^4$. A suitable number of such discharge ports may be employed. Two are illustrated, and the combined cross-sectional area of such discharge nozzles is substantially equal to the cross-sectional area of the channel $g$, and none of the said discharge ports $g^4$ should have a cross-sectional area in excess of the cross-sectional area of the bore $g^3$. Immediately below the said discharge ports $g^4$ the end of the plug $g^2$ is tapered as at $g^5$ to substantially a point whereon the drops are formed. The usual sight feed fixture H is threaded upon the lower part of the valve body G, and has openings $h$ protected by glasses $h^1$ for observing the drip, and upon the lower part of said fixture a threaded extension $h^2$ is provided for attachment to the bearing which has a bore $h^3$.

In the operation of my lubricator the device is filled by closing the valve $g^1$, closing the air valve E, and removing the feed plug D. The lubricant is then poured into the cup through the opening $b$ until the cup is filled, whereupon the plug D is replaced and the valve $g^1$ is opened. The lubricant immediately upon the opening of the valve $g^1$ will pass into the lower part of the tube $a$, the bores $g$ $g^3$, and into the double discharge ports $g^4$, and a few drops may be fed from the nipple $g^5$. The air valve E then being opened and adjusted to the desired position, wherein it is held by the spring finger $e^1$, will admit air slowly and in the desired quantity, causing a drip to take place as desired. The inflow of such air will effectually maintain the air port $a^1$ clean and prevent its being choked up by the grease or other lubricant.

In practice I have found that an exceedingly accurate adjustment of lubricant when employing liquid grease as such lubricant, may be attained by the use of the apparatus above described. I do not however necessarily regard my invention as limited to the particular details of construction which have been described with particularity, as equivalent devices may be employed within the limits of the appended claims.

I claim as my invention:—

1. In a lubricator, a cup, an air inlet having a tapered valve seat and including a straight restricted air channel a valve in said inlet having a correspondingly tapered portion and means for adjusting said valve whereby the passage between said tapered valve and seat may be varied and said valve having a straight stem having a loose fit in said restricted channel providing a narrow slit-like passage of constant size and an outlet for the lubricant from the cup.

2. A lubricator comprising a cup, means for supplying air thereto comprising a valve having a tapered portion and a straight portion and adjustably mounted in an air inlet to said cup of corresponding shape, and providing with said inlet a plurality of narrow air passages between the surfaces of said valve and inlet, the passage between the respective tapered surfaces of said valve and inlet adapted to be increased in size by adjustment of the valve and the surface of the straight portion of said valve fitting closely to the corresponding surface of the inlet thereby providing a narrow slit-like passage of constant width at all adjustments of the valve, means for conveying said air to said cup, and an outlet from said cup.

3. In a lubricator, a cup provided with an air inlet, an adjustable valve adapted to control said inlet and provided with a channel of increasing effective width as the valve is opened, and with a straight reduced extension on the stem having a loose fit with a restricted portion of the channel, providing an air inlet of small thickness which is of constant area at all positions of the valve.

4. In a lubricator, a cup provided with an air inlet, an adjustable valve stem for controlling said air inlet, an air channel of variable size on said stem, said inlet provided with an annular tapered seat, and a correspondingly shaped valve on the said stem, the adjustment of said stem varying the effective area of the channel in said stem and of the space between the valve and its seat, and an annular straight reduced extension on said stem having a loose fit in a correspondingly shaped portion in said air inlet, providing a passage between the valve and lubricant reservoir of constant area at all positions of the valve, and of a slight thickness compared with its width.

5. In a lubricator, a cup provided with an air inlet, a valve stem threaded in said air inlet and having an air channel of variable size, said inlet provided with an annular tapered seat inside of said threaded part, and a correspondingly shaped valve on said stem, said valve stem being adjustable whereby the air channel is increased or decreased in size, and an annular straight reduced extension on said stem inside of said tapered part having a close fit in a correspondingly shaped portion in said air inlet, providing an inlet of constant area at all positions of the valve, but of little thickness.

6. In a lubricator, a cup, an air inlet having a tapered valve seat and including a restricted air channel and an adjustable valve in said inlet having a correspondingly tapered portion, and a rod in said restricted channel and having a loose fit therein providing a narrow slit-like passage of constant size and an outlet for the lubricant from the cup.

7. In a lubricator, a cup, an air inlet having a tapered valve seat and including a restricted air channel and an adjustable valve in said inlet having a correspondingly tapered portion, the side walls of the passage forming said restricted channel being located closely adjacent one another whereby a narrow slit-like passage is formed of constant size and adapted to exert a uniform retarding effect upon the passage of the air.

8. In a lubricator, a cup, a tube therein, an air inlet to said tube, having a tapered valve seat and including a restricted portion, a tapered valve adjustably mounted in said inlet, the side walls of the passage forming said restricted portion being located closely adjacent one another whereby a narrow slit-like passage is formed of constant size and adapted to exert a uniform retarding effect upon the passage of the air, an air outlet port from said tube at the lower part of the cup, an unobstructed lubricant port in said tube above the floor of the cup below said air port and of larger size than said air port, and a partition extending across said tube between said ports.

In witness whereof, I have hereunto signed my name in the presence of two subscribing witnesses.

THOMAS O. ORGAN.

Witnesses:
  HAROLD AMOS BUZBY,
  PATRICK HICKEY.

---

Copies of this patent may be obtained for five cents each, by addressing the "Commissioner of Patents, Washington, D. C."